US 6,590,840 B2

(12) United States Patent
Inoue et al.

(10) Patent No.: US 6,590,840 B2
(45) Date of Patent: Jul. 8, 2003

(54) RECORDING MEDIUM REPRODUCTION APPARATUS

(75) Inventors: Hideo Inoue, Mitaka (JP); Saiji Tutiya, Fuchu (JP); Yasunobu Shimizu, Tokyo (JP); Kenji Oniki, Musashino (JP)

(73) Assignee: TEAC Corporation, Tokyo (JP)

( * ) Notice: Subject to any disclaimer, the term of this patent is extended or adjusted under 35 U.S.C. 154(b) by 243 days.

(21) Appl. No.: 09/733,724

(22) Filed: Dec. 8, 2000

(65) Prior Publication Data

US 2001/0017821 A1 Aug. 30, 2001

(30) Foreign Application Priority Data

Feb. 25, 2000 (JP) ........................................ 2000-050079
Dec. 1, 2000 (JP) ........................................ 2000-367736

(51) Int. Cl.[7] ............................................. G11B 21/08
(52) U.S. Cl. .................... 369/30.27; 84/628; 381/61; 369/30.23
(58) Field of Search ........................... 369/30.27, 30.1, 369/30.11, 30.12, 47.23, 47.28, 53.34, 30.23; 84/605, 628, 626, 627; 463/37, 38, 23; 381/61, 56

(56) References Cited

U.S. PATENT DOCUMENTS

| 5,512,704 A | * | 4/1996 | Adachi | .................... | 84/605 |
| 6,175,632 B1 | * | 1/2001 | Marx | ........................... | 381/56 |
| 6,379,244 B1 | * | 4/2002 | Sagawa et al. | ................ | 463/7 |
| 6,434,100 B1 | * | 8/2002 | Usui | ....................... | 369/53.31 |

FOREIGN PATENT DOCUMENTS

| JP | 11-86447 A | * | 3/1999 | ............. | 369/30.27 |
| JP | 11086446 A |   | 3/1999 |              |           |
| JP | 11-213520 A | * | 8/1999 | ............. | 369/30.27 |

* cited by examiner

*Primary Examiner*—Tan Dinh
(74) *Attorney, Agent, or Firm*—Anderson Kill & Olick; Eugene Lieberstein; Michael N. Meller

(57) ABSTRACT

A recording medium reproduction apparatus is provided, which apparatus includes: a reproduction instruction unit which inputs instructions on a direction and a rate of a scratch reproduction of a recording medium; a data storage unit which stores data read out from the recording medium, the data being separated by a reference position at which the scratch reproduction is started into first and second halves each having a predetermined time length; and a scratch reproduction system which reads and reproduces the data stored in the data storage unit in accordance with the instructions input by the reproduction instruction unit.

5 Claims, 10 Drawing Sheets

RECORDING MEDIUM REPRODUCTION APPARATUS

BACKGROUND OF THE INVENTION

1. Field of the Invention

The present invention generally relates to recording medium reproduction apparatus, and more particularly to a recording medium reproduction apparatus which performs a special reproduction of a recording medium.

2. Description of the Related Art

Conventionally, a method of playing music called scratch, which method employs a record and a record player, has been known. According to this scratch method, for example, in the field of dance music, a player called disc jockey (DJ) controls the rotation of a record rotating on a turntable to play dance music.

An operation according to the scratch method (a scratch operation) is performed as follows. First, the DJ rotates the record in a reverse direction by a few centimeters with a reproducing stylus being placed thereon. Then, the DJ rotates the record in a forward (reproduction) direction and again in the reverse direction. The DJ repeats the above-described scratch operation several times. A sound reproduced by the scratch method is a combination of a sound generated when the reproduction stylus traces a groove of the record in the reverse direction to the reproduction direction, and a short phrase reproduced when the record is rotated in the forward direction thereafter. A rhythm unique to the scratch method is generated by repeating the above-described combination of the sound and the short phrase several times. The rhythm generated by the scratch method is an essential, important element of some dance music.

Conventionally, the DJ performs the scratch method employing an analog record. According to the scratch method, the scratch sound is obtained by continuously rotating the analog record in the forward and reverse directions over a given range at a high or low speed in reproducing music recorded on the analog record. It is strongly desired to generate the same scratch sound also from a recording medium such as a compact disk (CD) storing digital music data.

However, according to a conventional CD reproduction apparatus, it is impossible to generate a scratch sound as in the case of the analog record by continuously rotating a CD in forward and reverse directions over a given range at a high or low speed in reproducing music recorded on the CD, thus preventing a scratch effect from being obtained.

SUMMARY OF THE INVENTION

It is a general object of the present invention to provide a recording medium reproduction apparatus in which the above-described disadvantage is eliminated.

A more specific object of the present invention is to provide a recording medium reproduction apparatus which can perform a scratch operation so that a scratch sound conventionally generated by using an analog record can be generated by using a recording medium stored with digital music data.

The above objects of the present invention are achieved by a recording medium reproduction apparatus including: a reproduction instruction unit which inputs instructions on a direction and a rate of a scratch reproduction of a recording medium; a data storage unit which stores data read out from the recording medium, the data being separated by a reference position at which the scratch reproduction is started into first and second halves each having a predetermined time length; and a scratch reproduction system which reads and reproduces the data stored in the data storage unit in accordance with the instructions input by the reproduction instruction unit.

By thus storing the future and past data with respect to the reference position, which data are read out from the recording medium, and by reproducing the stored data based on the input instructions on the direction and rate of the scratch reproduction, the scratch reproduction can be performed by using the recording medium stored with digital music data.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of embodiments of the present invention.

Figure 1:
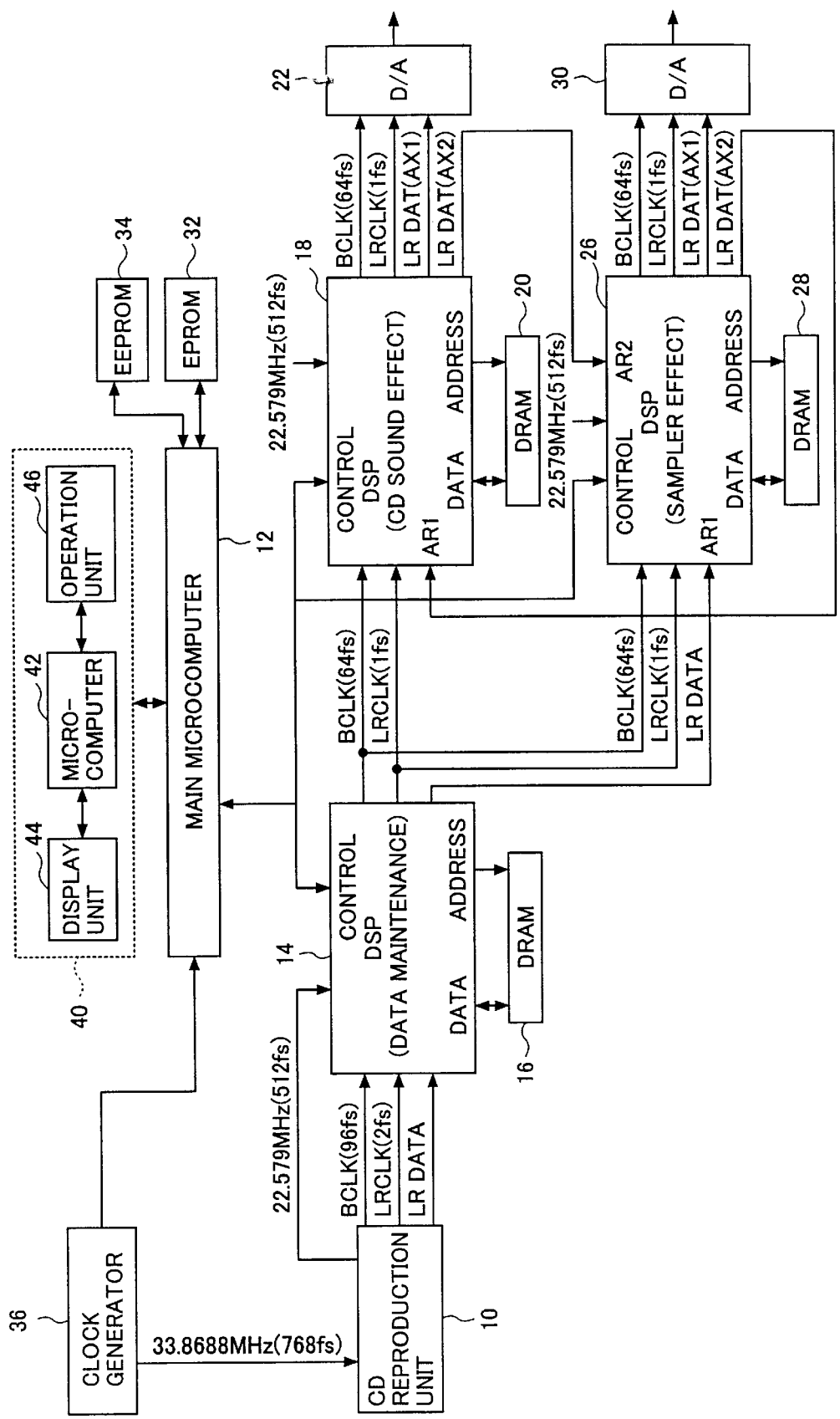
FIG. 1 is a block diagram of an embodiment of a recording medium reproduction apparatus according to the present invention.

FIG. 1 is a block diagram of an embodiment of a recording medium reproduction apparatus according to the present invention. According to FIG. 1, a CD reproduction unit 10 rotationally drives a CD that is a recording medium at a reproduction rate twice as high as a normal reproduction rate (double rate). A reproduction signal reproduced at the double rate by a pickup of the CD reproduction unit 10 is supplied to a CD reproduction digital signal processor (DSP) in the CD reproduction unit 10 via a radiofrequency (RF) amplifier. In the CD reproduction DSP, a signal processing, such as a demodulation using eight to fourteen modulation (EFM) or a decoding using cross-interleave Reed-Solomon code (CIRC), is performed on the reproduction signal.

A subcode is separated from the reproduction signal to be decoded. The subcode data is stored in a random access memory (RAM) in a main microcomputer 12 in accordance with a counter signal supplied from the main microcomputer 12. Audio data subjected to the signal processing in the CD reproduction DSP is supplied to a data maintenance DSP 14. A dynamic RAM (DRAM) 16 for storing the audio data is connected to the data maintenance DSP 14, which serves as a memory controller. The DRAM 16 is capable of storing the audio data transmitted from the data maintenance DSP 14 for approximately ten seconds for example, and serves to realize a variety of functions, such as an anti-shock function for providing protection when a sound skip is caused by a defect in the audio data, a quick start function for instantaneously starting a desired tune, a seamless loop function for repeatedly reproducing the audio data between predetermined two points, a function for a scratch processing, a function for varying the tempo of a tune, and a brake function for gradually reducing the reproduction rate to stop the reproduction.

The data maintenance DSP 14 writes the audio data read at the double rate into the DRAM 16 in accordance with the counter signal supplied from the main microcomputer 12, and simultaneously reads the audio data at a single rate (normal rate) in accordance with the counter signal supplied from the main microcomputer 12 so as to supply the audio data to a CD sound effect DSP 18.

A work memory DRAM 20 is connected to the CD sound effect DSP 18, which performs a variety of effect processing, such as a key (musical interval) adjustment, an output level adjustment, and a voice reduction function to reduce only the volume of the vocal sound of a tune. The audio data output from the DSP 18 is supplied to a digital-to-analog (D/A) converter 22 through a digital filter, and is also supplied to a sampler effect DSP 26.

An audio data storage DRAM 28 is connected to the sampler effect DSP 26, which serves as a memory controller. The audio data storage DRAM 28 is capable of storing the audio data for approximately ten seconds, for example. The sampler effect DSP 26 performs a sampler processing. The sampler effect DSP 26 stores the audio data picked up during a period between sampling start and end points specified by a user into the audio data storage DRAM 28, and reads the stored audio data at a reproduction timing specified by the user to supply the stored audio data to a D/A converter 30 and to the DSP 18. The DSP 18 combines the output audio data thereof with the audio data supplied from the DSP 26 to supply the combined audio data to the D/A converter 22.

The main microcomputer 12 is connected to an erasable and programmable read only memory (EPROM) 32 storing programs and data for processing and to an electrically erasable and programmable read only memory (EEPROM) 34 into which a variety of set values of each tune or track, such as a tempo value and a loop point, are stored. A clock generator 36 generates a clock signal and supplies the clock signal to the CD reproduction unit 10 and to the main microcomputer 12.

The main microcomputer 12 reads the subcode from the RAM housed therein in accordance with the counter signal to supply the subcode to a microcomputer 42 of a controller unit 40. The microcomputer 42 converts the subcode into a time code and displays the time code on a display unit 44. The controller unit 40, which includes an operation unit 46 including a variety of operation keys operated by the user, is connected to the microcomputer 42.

Figure 2:
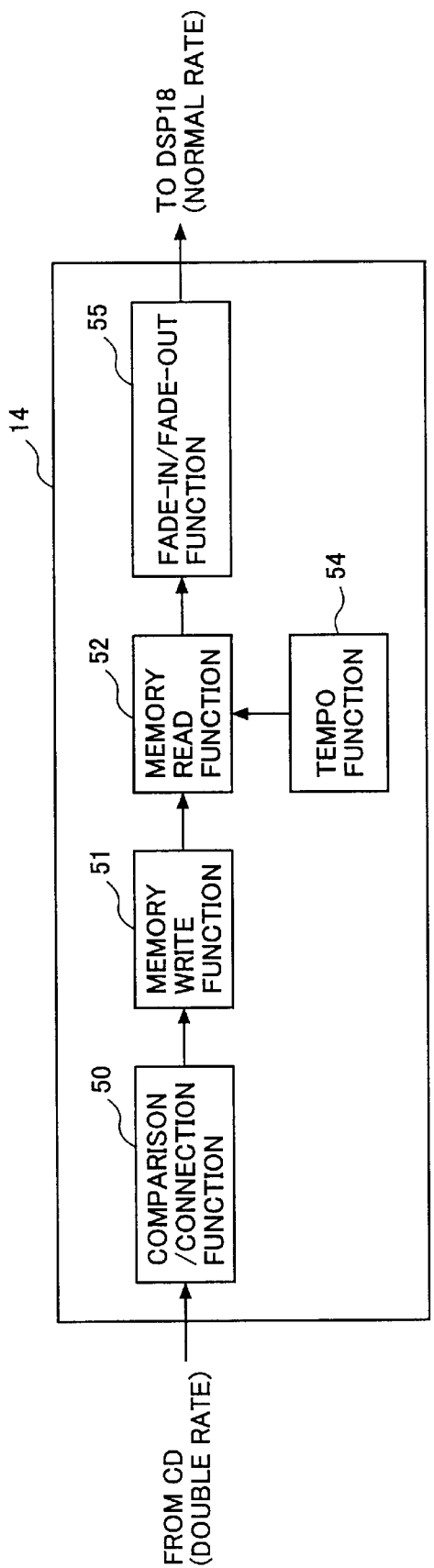
FIG. 2 is a block diagram showing functions of a data maintenance DSP shown in FIG. 1.
Figure 3:
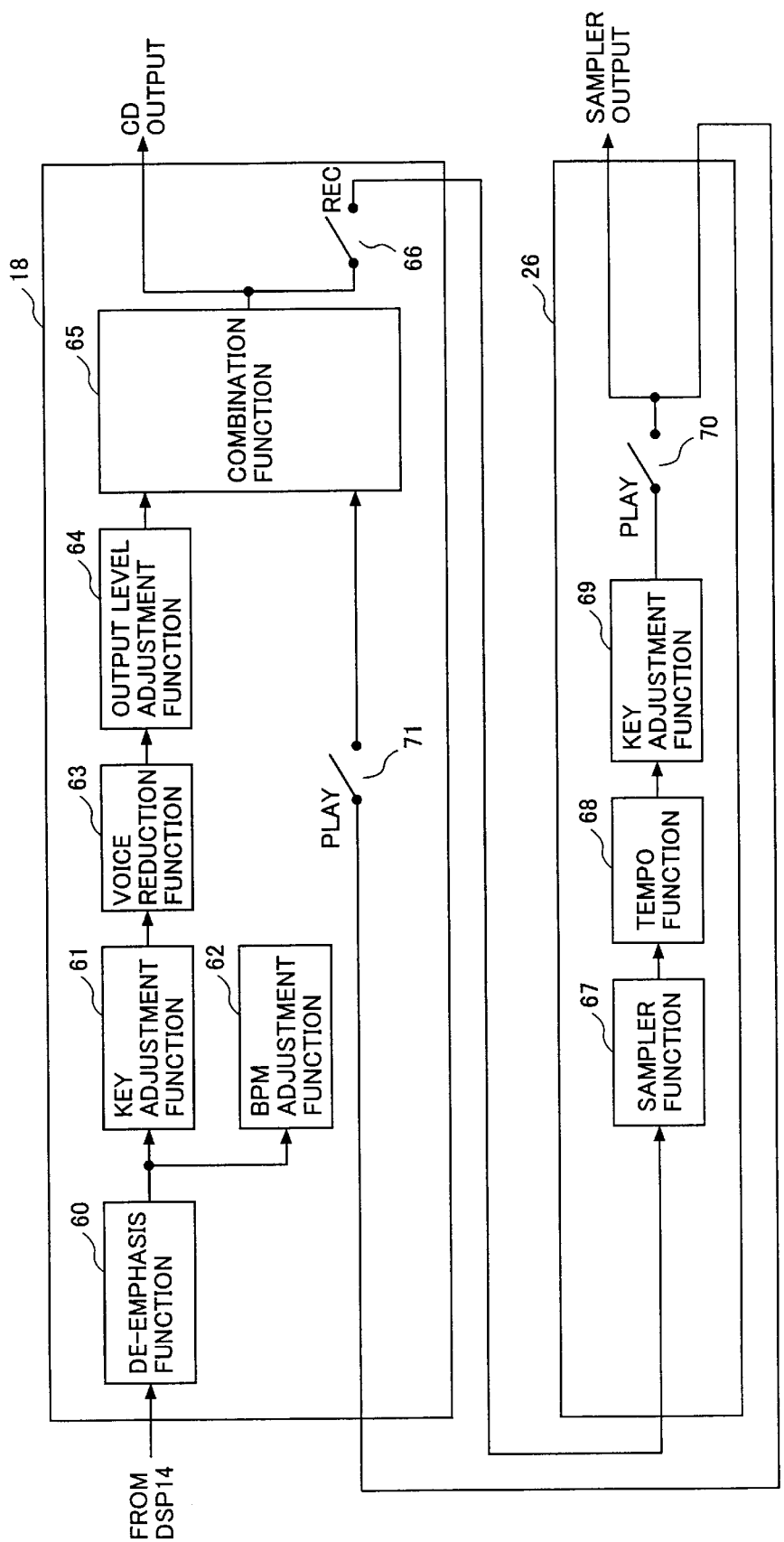
FIG. 3 is a block diagram showing functions of a CD sound effect DSP and a sampler effect DSP shown in FIG. 1.

FIG. 2 is a block diagram showing functions of the DSP 14, and FIG. 3 is a block diagram showing functions of the DSPs 18 and 26. As shown in FIG. 2, a comparison/connection function 50 of the DSP 14, in accordance with the counter signal supplied from the main microcomputer 12, compares audio data read at the double rate with the last data stored in the DRAM 16, and connects the audio data to the last data stored in the DRAM 16. A memory write function 51 writes the connected audio data into the DRAM 16. A memory read function 52 reads audio data out of the DRAM 16. A tempo function 54 varies a read rate of the memory read function 52 for a tempo adjustment. A fade-in/fade-out function 55 adjusts the level of audio data at a time of fade-in or fade-out.

In FIG. 3, a de-emphasis function 60 of the DSP 18 performs a de-emphasis processing to return an emphasis level at a time of CD recording to its original level. A key adjustment function 61 fixes the tempo and variably adjusts the key. A beats per minute (BPM) function 62 counts the number of beats per minute of a tune. A voice reduction function 63 reduces the volume of the vocal sound of a tune. An output level adjustment function 64 adjusts an output level. The output level adjustment function 64 outputs the audio data through a combination function 65, and supplies the audio data to a sampler function 67 of the DSP 26 when a switch 66 is "ON".

The sampler function 67 writes audio data into the DRAM 28, and, when a switch 70 is "ON", reads the audio data out of the DRAM 28. A tempo adjustment function 68 adjusts the tempo of the audio data supplied from the sampler function 67. A key adjustment function 69 fixes the tempo and variably adjusts the key. Thereafter, the key adjustment function 69 outputs the audio data through the switch 70, and supplies the audio data to the combination function 65 through a switch 71 of the DSP 18, which switch is switched "ON" together with the switch 70. The combination function 65 combines the audio data supplied from the key adjustment function 69 with the audio data supplied from the output level adjustment function 64 to output the combined audio data.

Figure 4:
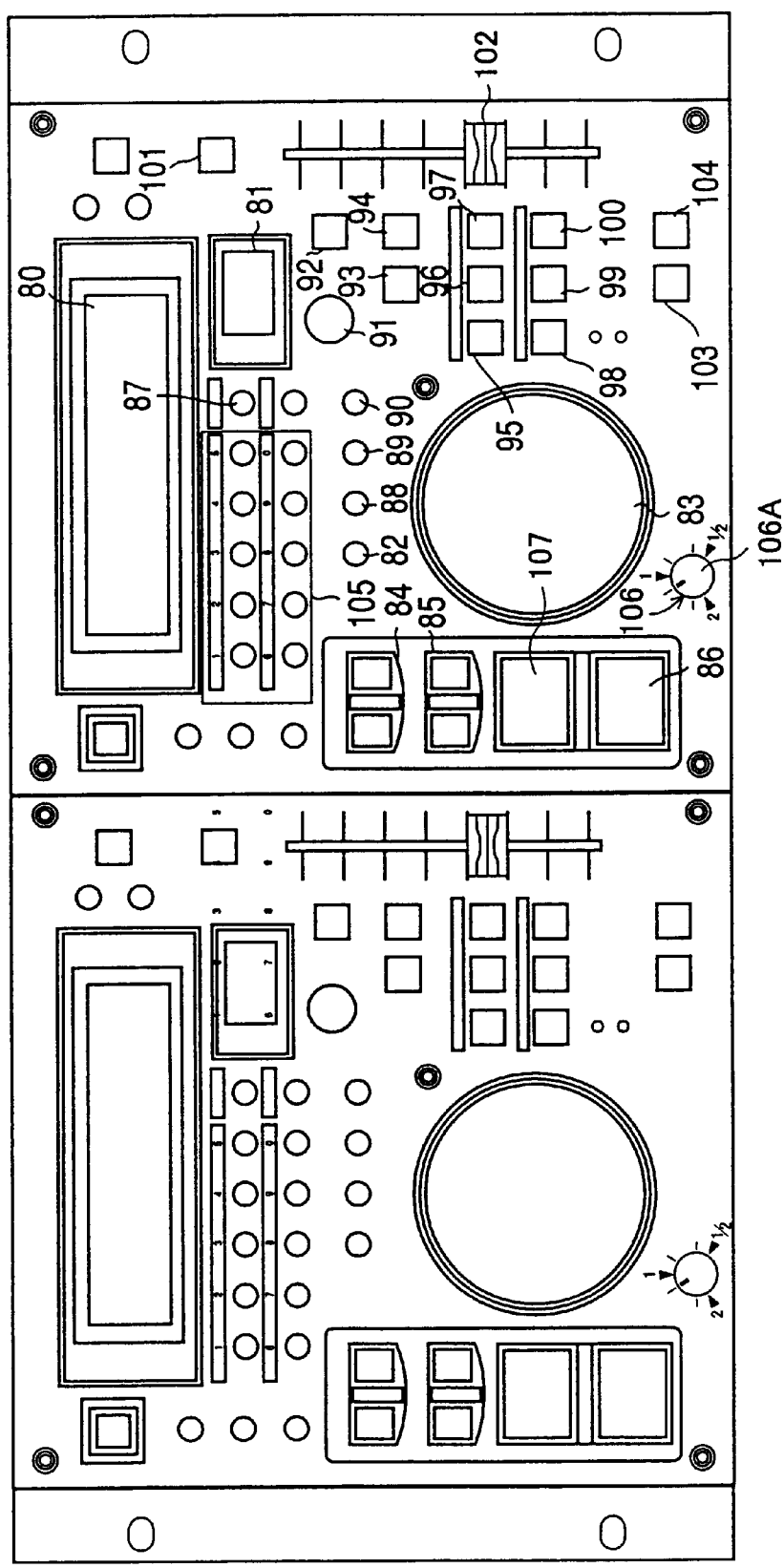
FIG. 4 is a plan view of controller units of a pair of the recording medium reproduction apparatus according to the present invention.

The recording medium reproduction apparatus shown in FIG. 1 is used in pairs, and the main microcomputers of the two recording medium reproduction apparatus exchange control information between each other to be interlocked with each other in operation. FIG. 4 is a plan view of the controller units 40 of a pair of the recording medium reproduction apparatus. Since the respective controller units 40 have the same structure, only one of the respective units 40 is referred to by numerals in a description thereof given below.

According to FIG. 4, a display 80 of the display unit 44 displays a variety of information such as a track number and a time code, while a display 81 of the display unit 44 displays a BPM value. The operation unit 46 includes a preset key 82, a jog dial 83, a skip key 84, a search key 85, a play/pause key 86, a bank key 87, a memory key 88, a recall key 89, an enter key 90, a TAP key 91, a BPM key 92, a tempo SYNC key 93, a beat SYNC key 94, a loop key 95, an A key 96, a B key 97, a sample key 98, an IN key 99, an OUT key 100, a tempo key 101, a tempo volume 102, a scratch key 103, a brake key 104, a ten key 105, a jog speed setting key 106, and a queue key 107.

According to the present invention, to perform a scratch operation, the scratch key 103 is first pressed to set the controller unit 40 ready for a scratch, and the jog dial 83 is rotated to perform a scratch reproduction. The jog dial 83 employs a rotary encoder or the like and transmits rotation detection pulses to the microcomputer 42 so that the speed, direction, and cessation of the rotation of the jog dial 83 can be recognized. The jog dial 83 is rotated clockwise to perform a forward reproduction, and is rotated counterclockwise to perform a reverse reproduction. The scratch reproduction can be performed even when a normal reproduction is paused or performed.

Figure 5:
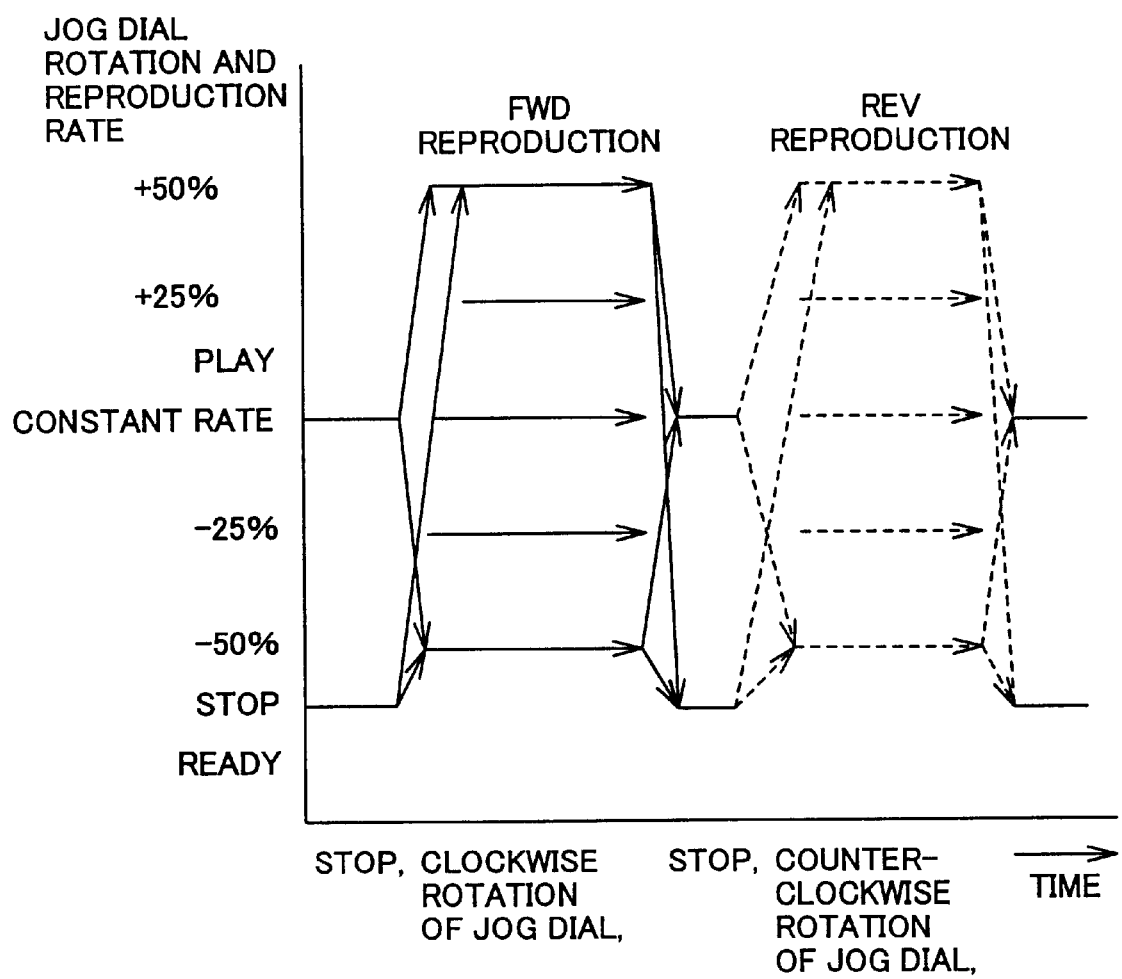
FIG. 5 is a graph of an embodiment of a scratch operation.

FIG. 5 is a graph of an embodiment of a scratch operation.

The scratch operation can be performed by pressing the scratch key 103 and then rotating the jog dial 83 clockwise and counterclockwise. The reproduction rate varies depending on the rotation speed of the jog dial 83. The reproduction rate varies over a range of ±50% of the normal reproduction rate. When the scratch operation is performed from a PLAY (normal reproduction) state in which the reproduction is performed at a constant rate (normal reproduction rate), the reproduction is set in the PLAY state after the scratch operation is over. Time required to set the reproduction in the PLAY state after the scratch operation is over can be changed by the preset key 82. If the required time is set in the EEPROM 34 shown in FIG. 1 to have four values of 0.2 second, which is a default value (standard), 0.1 second, 0.5 second, and 1.0 second, by selecting a selection mode by the preset key 82, the set values can be changed by the jog dial 83 to be determined by the enter key 90.

Compared with the set value of 0.1 second, a normal reproduced sound takes time in being output after the scratch operation with the set value of 0.5 second, thus preventing the succession of the scratch operation and the normal reproduction operation. When the scratch operation is performed from a READY (pause) state in which the jog dial 83 remains stationary, the reproduction is set in the READY state after the scratch operation is over.

For example, if the scratch operation is performed to take paths indicated by arrows shown in FIG. 5, the jog dial 83 is rotated clockwise at a speed of two rotations per second from the stationary state thereof to set the forward reproduction rate at a rate of +50%. Thereafter, the jog dial 83 is set at rest and then is rotated counterclockwise at a speed of 0.7 rotation per second (three-quarters rotation per second) to set the reverse reproduction rate at a rate of −25%. Thus, any scratch operation can be realized by the combination of the clockwise and counterclockwise rotation and the rotational speed of the jog dial 83. In FIG. 5, "+" shows a rate higher than the constant rate, and "−" shows a rate lower than the constant rate. Further, in FIG. 5, the solid lines show the forward reproduction and the broken lines show the reverse reproduction.

The above-described values of the rotational speed with respect to the reproduction rates are examples. The rotational speed with respect to the reproduction rate can be changed by the preset key 82. If the rotational speed of the jog dial 83 with respect to the reproduction rate of +50% is set in the EEPROM 34 shown in FIG. 1 to have three values of two rotations per second, which is a default value, three rotations per second, and 1.5 rotations per second, by selecting the selection mode by the preset key 82, the set values can be changed by the jog dial 83 to be determined by the enter key 90. The values of the rotational speed of the jog dial 83 with respect to the minus reproduction rates are simultaneously changed at the same rate.

If the operation speed of the jog dial 83 remains the same, compared with the value of three rotations per second at the reproduction rate of +50%, the scratch operation can reproduce a higher-keyed sound over a longer reproduction length with the value of 1.5 rotations per second at the reproduction rate of +50%.

Further, the rotational speed of the jog dial 83 with respect to the reproduction rate can be changed by means of the jog speed setting switch 106. A dial 106A of the jog speed setting switch 106 is turned counterclockwise to be set at a position of "2" so that the rotational speed with respect to the reproduction rate can be set to have double the value set by the preset key 82. If the dial 106A is set at a center position of "1", the rotational speed can be set to have the value set by the preset key 82. If the dial 106A is turned clockwise to be set at a position of "½", the rotational speed can be set to have half the value set by the preset key 82. The values of the rotational speed with respect to the reproduction rate can be changed gradually or continuously within a range from the above-described position "½" to the position "2" of the dial 106A. The jog speed setting switch 106 allows the DJ to easily set a desired value of the rotational speed with respect to the reproduction rate, and to achieve a scratch performance with a desired key over a desired reproduction length.

Figure 6:
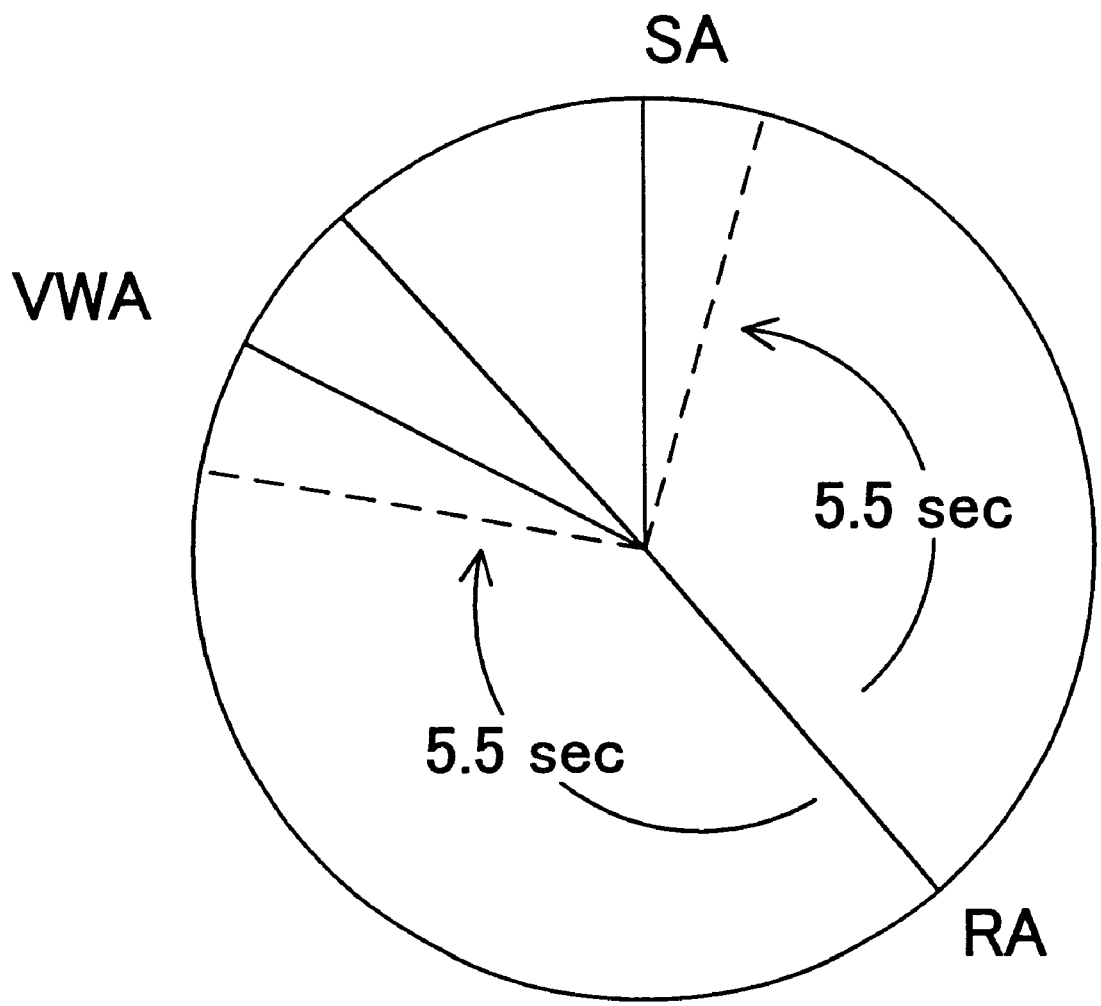
FIG. 6 is a diagram showing a state of a DRAM for storing audio data during a scratch operation.

FIG. 6 is a diagram showing a state of the DRAM 16 during a scratch operation.

According to FIG. 6, the audio data is stored in positions clockwise from SA to VWA in an order reproduced in the CD reproduction unit 10. A normal scratch reproduction by the scratch operation always reproduces the audio data from the CD at the double rate, and stores the reproduced audio data in the DRAM 16. A maximum of 11-second-long audio data is stored over the positions SA to VWA in the DRAM 16. The position SA is set as a readout reference position during a normal anti-shock reproduction.

In the case of a reproduction in a scratch mode, with a position RA, which is a counterclockwise mid-position between the positions VWA and SA, being set as a reference position, the 5.5-second-long first half of the audio data (future data) is stored in the DRAM 16 over a region from the reference position RA to the position VWA, and the 5.5-second-long second half of the audio data (past data) is stored in the DRAM 16 over a region from the position SA to the reference position RA. The first and second halves of the audio data are necessary for the forward and reverse reproductions, respectively. With the reproduction being in the READY state in the scratch mode, if both of the 5.5-second-long future and past audio data are not stored in the respective above-described regions, one or both of the 5.5-second-long first and second halves of the audio data is/are reproduced so as to supplement deficient data. After the deficient data is stored, by operating the jog dial 83, the data stored in the DRAM 16 is read out in accordance with the rotational direction and speed of the jog dial 83 so that the scratch reproduction is performed. As shown in FIG. 6, the above-described regions are stored with the respective 5.5-second-long future and past data. However, only five-second-long data from the reference position RA is actually reproduced from each of the 5.5-second-long future and past data by the scratch operation.

In the case of rotating the jog dial 83 counterclockwise to perform the reverse reproduction, the audio data is reproduced by the scratch operation for five seconds from the reference position RA toward the position SA, and the reproduction of the audio data is ceased at a position 0.5 second short of the position SA. When the rotation of the jog dial 83 is stopped during the above-described operation, the normal reproduction is performed in the scratch mode in the case of the scratch reproduction in the PLAY state, and the reproduction enters the READY state in the case of the scratch reproduction in the READY state.

On the other hand, in the case of rotating the jog dial 83 clockwise to perform the forward reproduction, the audio data is reproduced by the scratch operation for five seconds from the reference position RA toward the position VWA. Thereafter, when the audio data is read out from the DRAM 16 up to a position 0.5 second short of the position VWA, the next audio data is prefetched from the CD to be stored in the DRAM 16 over a region following the position VWA. When the rotation of the jog dial 83 is stopped during the above-described operation, the normal reproduction is performed in the scratch mode in the case of the scratch reproduction in the PLAY state, and the reproduction enters the READY state in the case of the scratch reproduction in the READY state. Further, when a reproduction position falls between two tunes (tracks) during the scratch operation, the scratch reproduction is ceased because there is a section without any signal between the two tunes (tracks).

Figure 7:
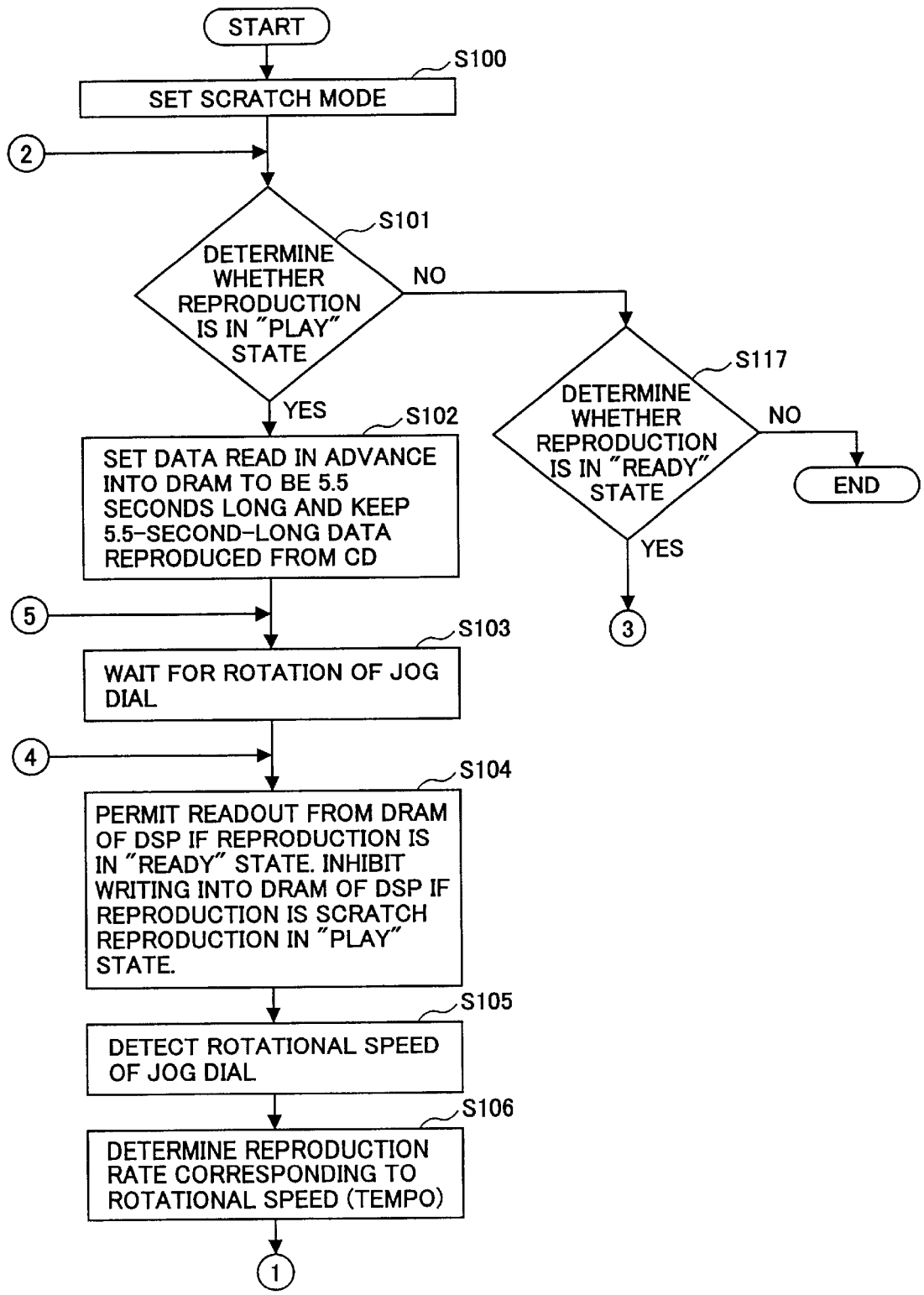
FIGS. 7 through 9 are flowcharts of a process of a scratch processing performed by the data maintenance DSP according to an embodiment of the present invention.
Figure 8:
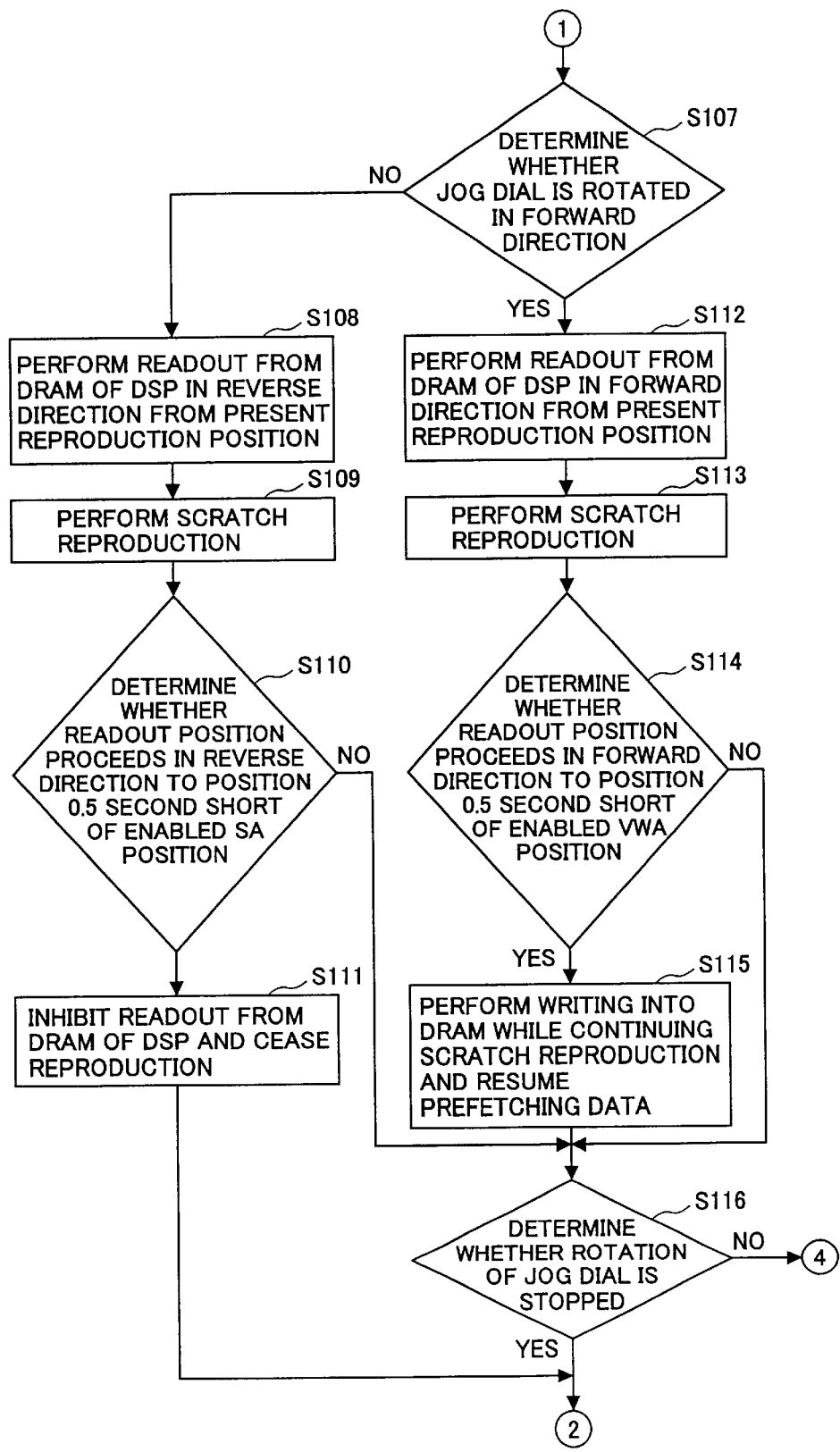
Figure 9:
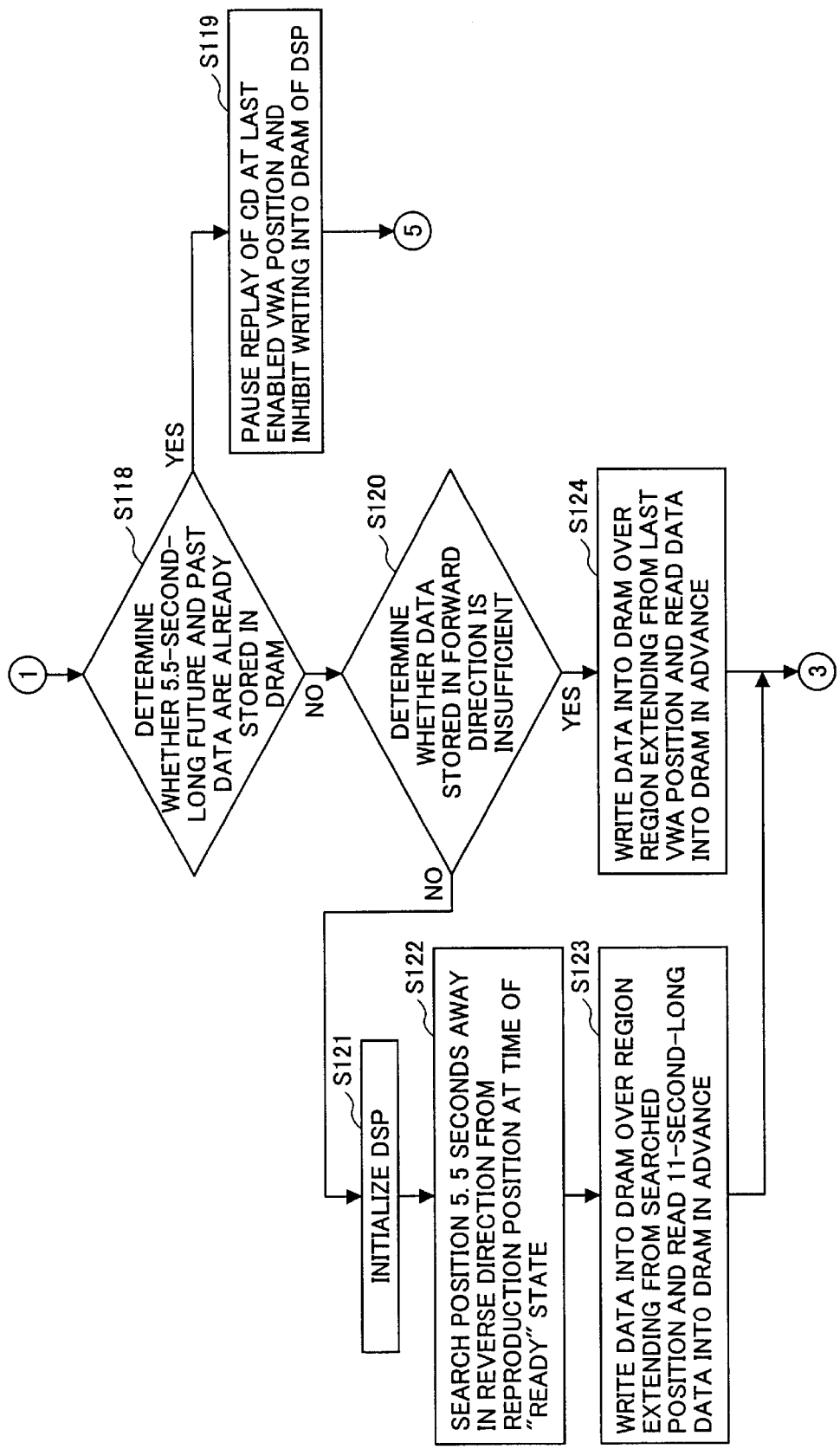

FIGS. 7 through 9 show a flowchart of a process of a scratch processing performed by the DSP 14 according to an embodiment of the present invention. First, in step S100 of FIG. 7, the scratch key 103 is pressed to set the scratch mode. Then, in step S101, it is determined whether the reproduction is in the PLAY state. If it is determined in step S101 that the reproduction is in the PLAY state, the process goes to step S102. In step S102, audio data read in advance into the DRAM 16 is set to be 5.5 seconds long, and, while keeping 5.5-second-long audio data already read out from the DRAM 16 and stored therein over the region from a present reproduction position (a data readout position on the DRAM 16), which is set to be the reference position RA, to the position SA, the 5.5-second-long audio data reproduced from the CD is kept in the DRAM 16 over the region from the reference position RA to the position VWA. Thereafter, in step S103, the rotation of the jog dial 83 is waited for, and when the jog dial 83 is rotated, the process goes to step S104. In step S104, if the reproduction is in the READY state, readout from the DRAM 16 of the DSP 14 is permitted, and if the reproduction is the scratch reproduction in the PLAY state, writing into the DRAM 16 of the DSP 14 is inhibited. Next, in step S105, a rotational speed of the jog dial 83 is detected, and, in step S106, a reproduction rate corresponding to the rotational speed (TEMPO) is determined. Thus, in steps S101 through S106, it is determined whether the reproduction is in the PLAY state or in the READY state in the scratch mode, and, in compliance with the respective states, data is written and stored into the DRAM 16, and the reproduction rate is set. Steps following step S106 are shown in FIG. 8.

If it is determined in step S101 that the reproduction is not in the PLAY state, in step S117, it is determined whether the reproduction is in the READY state. If it is determined in step S117 that the reproduction is in the READY state, the process goes to step S118 and steps shown in FIG. 9 are performed. On the other hand, if it is determined that the reproduction is not in the READY state, this scratch processing ends.

In FIG. 8, first in step S107, it is determined, based on the detection result of the rotation of the jog dial 83 in step S103, whether the jog dial 83 is rotated in a forward direction. If it is determined that the jog dial 83 is not rotated in the forward direction, that is, that the jog dial 83 is rotated in a reverse direction, the process goes to step S108. In step S108, the readout from the DRAM 16 of the DSP 14 is performed in a reverse direction toward the position SA from the present reproduction position. In performing step S108 for the first time, the readout from the DRAM 16 is started from the reference position RA. Thereafter, in step S109, the scratch reproduction is performed. During this scratch reproduction, in step S110, it is determined whether the readout position proceeds in the reverse direction to a position 0.5 second short of an enabled SA position. If it is determined in step S110 that the readout position proceeds to the position 0.5 second short of the enabled SA position, in step S111, the readout from the DRAM 16 is inhibited and the reproduction is ceased.

Thereafter, the process returns to step S101 shown in FIG. 7 and the steps thereafter are performed so that an operation such as the writing of data into the DRAM 16 during the reproduction in the PLAY state is performed. If it is determined in step S110 that the readout position does not proceed to the position 0.5 second short of the position SA, in step S116, it is determined whether the rotation of the jog dial 83 is stopped. If it is determined that the rotation of the jog dial 83 is stopped, step S107 and the steps thereafter shown in FIG. 7 are performed. If it is determined that the rotation is not stopped, step S104 and the steps thereafter shown in FIG. 7 are performed.

If it is determined in step S107 that the jog dial 83 is rotated in the forward direction, the process goes to step S112. In step S112, the readout from the DRAM 16 of the DSP 14 is performed in a forward direction toward the position VWA from the present reproduction position. In performing step S112 for the first time, the readout from the DRAM 16 is started from the reference position RA. Thereafter, in step S113, the scratch reproduction is performed. During this scratch reproduction, in step S114, it is determined whether the readout position proceeds in the forward direction to the position 0.5 second short of an enabled VWA position. If it is determined in step S114 that the readout position proceeds to the position 0.5 second short of the enabled VWA position, in step S115, the readout from the DRAM 16 is continued to continue the scratch reproduction, and the next audio data is prefetched from the CD to be stored in the region following the position VWA on the DRAM 16.

Next, in step S116, it is determined whether the rotation of the jog dial 83 is stopped. If it is determined that the rotation is stopped, the process returns to step S101 shown in FIG. 7 and the steps thereafter are performed. If it is determined that the rotation is not stopped, the process returns to step S104 shown in FIG. 7 and the steps thereafter are performed. Thus, the scratch reproduction can be performed in the PLAY state in the scratch mode through steps S102 through S116.

Step S117 shown in FIG. 7, in which step it is determined whether the reproduction is in the READY state, is followed by step S118 shown in FIG. 9 and steps thereafter. In step S118, it is determined whether 5.5-second-long future and past audio data are already stored in the DRAM 16 over corresponding regions extending in the respective forward and reverse directions from a reproduction position at the time of the READY state. If it is determined that both of the 5.5-second-long future and past audio data are not stored in the respective regions, in step S120, it is determined whether it is the future audio data stored in the forward direction that is insufficient. If it is determined that the future data is insufficient, in step S124, data reproduced from the CD is written into the DRAM 16 over a region extending from the last VWA position so that the data is read into the DRAM 16 in advance.

On the other hand, if it is determined in step S120 that the future audio data stored in the forward direction is sufficient, but that the past audio data stored in the reverse direction is insufficient, in step S121, the DSP 14 is initialized. Then, in step S122, a position 5.5 seconds away in the reverse direction from the reproduction position at the time of the READY state is searched on the DRAM 16. In step S123, data reproduced from the CD is written into the DRAM 16 over a region extending from the searched position so that 11-second-long data is read into the DRAM 16 in advance. Thereafter, the process returns to step S118 and the steps thereafter are performed.

If it is determined in step S118 that both of the 5.5-second-long future and past audio data are stored in the respective regions, in step S119, the replay of the CR is paused at the last enabled VWA position, and the writing into the DRAM 16 is inhibited. Thereafter, the process returns to step S103 and the steps thereafter are performed.

By thus storing, in compliance with the PLAY and READY states in the scratch mode, the 5.5-second-long future and past data in the DRAM 16 over the respective regions extending in the forward and reverse directions from the scratch reproduction position and by performing the scratch operation using the stored data, the same scratch reproduction as that by an analog record player can be performed.

According to the above-described embodiment, the rotational speed of the jog dial 83 is detected in step S105. However, the rotational speed of the jog dial 83 rotated by the DJ varies slightly. Therefore, there is always an error between the actual rotational speed and time in the forward direction and those in the reverse direction. Thus, when the jog dial 83 is rotated, for example, clockwise from its initial position to start readout from the position RA on the DRAM 16, and then, is rotated counterclockwise to be returned to the initial position, the present reproduction position often deviates from the reference position RA. Therefore, when the jog dial 83 is further rotated clockwise from the initial position after being returned thereto so as to repeat the scratch operation, a readout start position on the DRAM 16 deviates from the above-described position RA so that an initial reproduced sound deviates from a desired sound.

Figure 10:
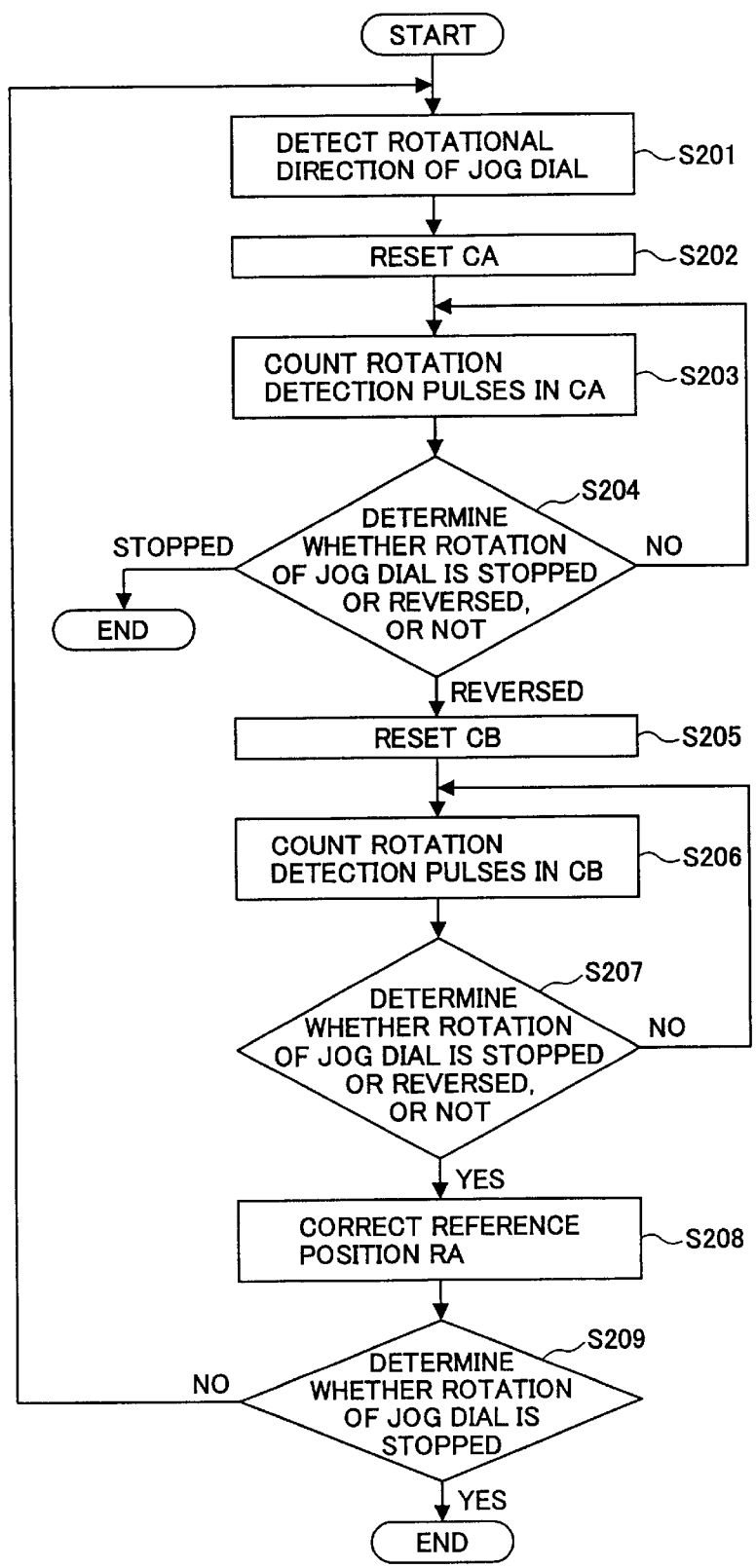
FIG. 10 is a flowchart of a process of a scratch correction processing performed by the data maintenance DSP according to an embodiment of the present invention.

FIG. 10 is a flowchart of a process of a scratch correction processing performed by the DSP 14 according to an embodiment of the present invention, in which embodiment the above-described disadvantage is eliminated. This processing is initiated when the scratch operation is started by the rotational operation of the jog dial 83, and is performed in parallel with the processing shown in FIGS. 7 through 9.

In FIG. 10, in step S201, the rotational direction of the jog dial 83 is detected, and in step S202, a first counter CA is reset. Then, in step S203, the first counter CA counts rotation detection pulses generated by the jog dial 83. In step S204, it is determined whether the rotation of the jog dial 83 is stopped or reversed, or not. If it is determined that the rotation is not stopped or reversed, the process returns to step S203 to continue counting the rotation detection pulses. If it is determined that the rotation is stopped, this processing ends. The stoppage of the rotation is determined when the rotation is stopped for longer than the time set by the preset key 82, which time is required to set the reproduction in the PLAY state after the scratch operation is over.

On the other hand, if it is determined in step S204 that the rotation is reversed, in step S205, a second counter CB is reset. Then, in step S206, the second counter CB counts the rotation detection pulses generated by the jog dial 83. In step S207, it is determined whether the rotation of the jog dial 83 is stopped or reversed, or not. If it is determined that the rotation is not stopped or reversed, the process returns to step S206 to continue counting the rotation detection pulses.

If it is determined in step S207 that the rotation is stopped or reversed, the process goes to step S208, in which the reference position RA is corrected. In step S208, a value obtained by the second counter CB is subtracted from a value obtained by the first counter CA to obtain an error pulse number. The error pulse number is multiplied by a memory shift amount per pulse to obtain an address correction amount, and the reference position RA on the DRAM 16 is shifted by the address correction amount. The memory shift amount per pulse is a value corresponding to a set value of the rotational speed of the jog dial 83 with respect to the reproduction rate. If the address correction amount is positive, the reference position RA is shifted in the rotational direction detected in step S201 (for example, clockwise). If the address correction amount is negative, the reference position RA is shifted in a rotational direction reverse to the rotational direction detected in step S201 (for example, counterclockwise).

Next, in step S209, it is determined whether the rotation of the jog dial 83 is stopped. If it is determined that the rotation is stopped, this processing ends. If it is determined that the rotation is not stopped, that is, that the rotation is reversed, the process returns to step S201 and the steps thereafter are performed.

Thus, when the jog dial 83 is rotated first, for example, clockwise from the initial position and then is rotated counterclockwise to be returned to the initial position, the reference position RA is corrected so as to correspond to a rotational angle position of the jog dial 83. Further, when the jog dial 83 is again rotated clockwise from the initial position to which the jog dial 83 is returned, the readout start position on the DRAM 16 is corrected, thus preventing an initial reproduced sound from deviating from a desired sound. According to this embodiment, in step S209, the error pulse number is obtained by subtracting the value obtained by the second counter CB from the value obtained by the first counter CA so that the address correction amount is obtained. However, the address correction amount may be obtained based on a ratio of the value obtained by the first counter CA to the value obtained by the second counter CB.

As a variation of the scratch reproduction, when the jog dial 83 is rotated clockwise and counterclockwise in the scratch mode to perform the scratch operation, only one of sounds reproduced in the forward and reverse directions may be output while muting the other. The recording medium reproduction apparatus according to the present invention includes a function to perform such a variation of the scratch operation.

First, the selection mode is selected by the preset key 82 of the operation unit 46, and "SCRT" is selected by the jog dial 83. Then, "NOR", "FWD", or "REV" is selected by the jog dial 83. In the case of selecting "NOR", the normal scratch reproduction is performed so that both of the sounds reproduced in the forward and reverse directions are output in the scratch mode. In the case of selecting "FWD", the variation of the scratch reproduction is performed so that only the sound reproduced in the forward direction is output in the scratch mode. In the case of selecting "REV", the variation of the scratch reproduction is performed so that only the sound reproduced in the reverse direction is output in the scratch mode.

As a method of muting a reproduced sound in the above-described variation of the scratch reproduction, a method which stops data from being read out from the DRAM 16 during a mute period, or a method employing muting which stops an output of an audio signal during a mute period can be employed.

Although a CD is used as a recording medium in the above-described embodiments, it is of course possible to use a DVD (Digital Versatile Disk), a MD (Mini Disk), a memory stick, or a flash memory as a recording medium.

The present invention is not limited to the specifically disclosed embodiments, but variations and modifications may be made without departing from the scope of the present invention.

The present application is based on Japanese priority applications No. 2000-050079 filed on Feb. 25, 2000, and No. 2000-367736 filed on Dec. 1, 2000, the entire contents of which are hereby incorporated by reference.

What is claimed is:

1. A recording medium reproduction apparatus comprising:
   a reproduction instruction unit which inputs instructions on a direction and a rate of a scratch reproduction of a recording medium;
   a data storage unit which stores data read out from the recording medium, the data being separated by a reference position at which the scratch reproduction is started into first and second halves each having a predetermined time length; and
   a scratch reproduction unit which reads and reproduces the data stored in said data storage unit in accordance with the instructions input by said reproduction instruction unit.

2. The recording medium reproduction apparatus as claimed in claim 1, wherein said reproduction instruction unit is a jog dial so that a direction and a rate of a readout of the data stored in said data storage unit are varied in accordance with a rotational direction and speed of the jog dial.

3. The recording medium reproduction apparatus as claimed in claim 2, further comprising a reference position correction unit which corrects the reference position based on an amount of a first rotation of the jog dial in a first direction and an amount of a second rotation of the jog dial in a second direction reverse to the first direction, the first rotation being followed by the second rotation.

4. The recording medium reproduction apparatus as claimed in claim 2, further comprising a setting change unit which changes the rotational speed of the jog dial with respect to the rate of the scratch reproduction.

5. The recording medium reproduction apparatus as claimed in claim 2, further comprising a scratch variation setting unit which outputs a reproduced sound when the jog dial is rotated in the first direction and mutes the reproduced sound when the jog dial is rotated in the second direction.

* * * * *